Dec. 16, 1930.  A. R. THOMPSON  1,785,016
FRUIT PITTER
Filed Feb. 2, 1926  4 Sheets-Sheet 2
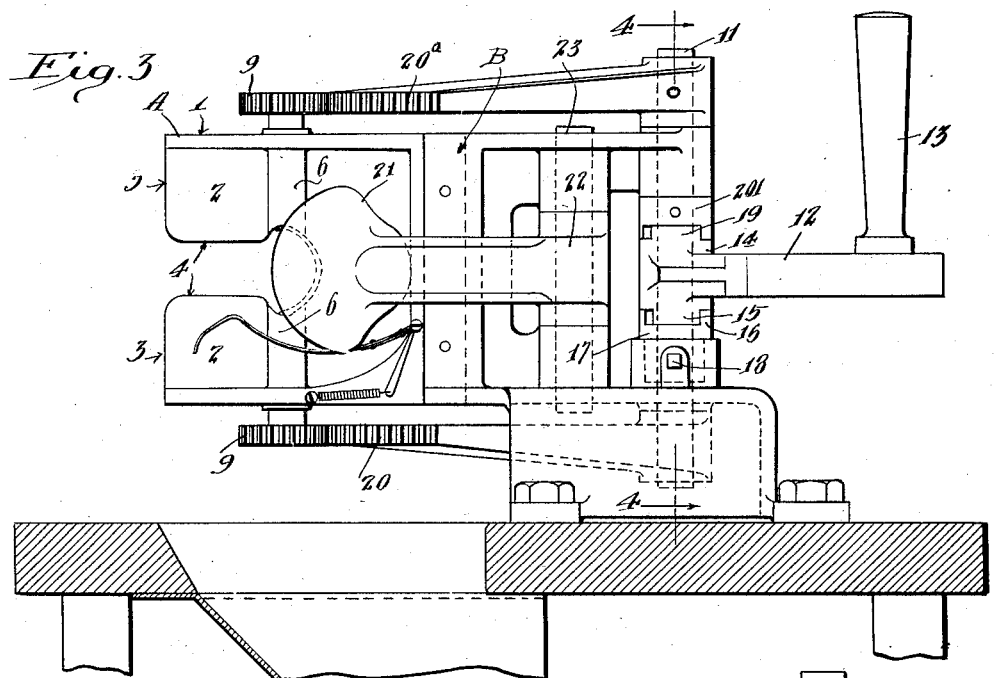
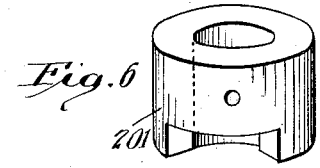
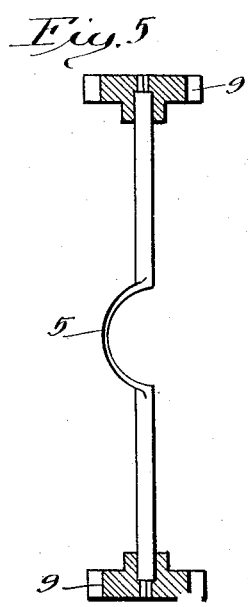
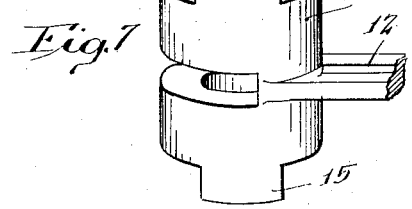
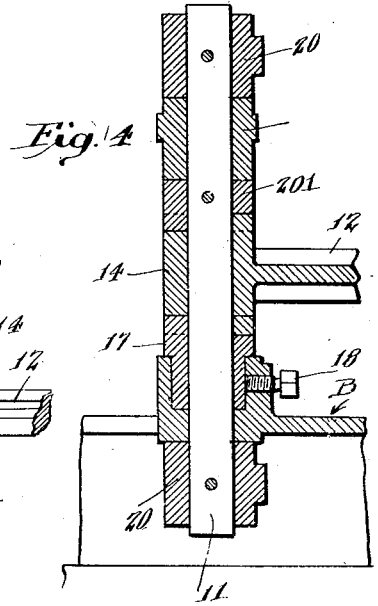
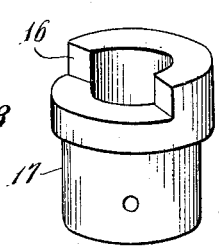
Inventor
Albert R. Thompson
By Lyou Thys
Attorneys

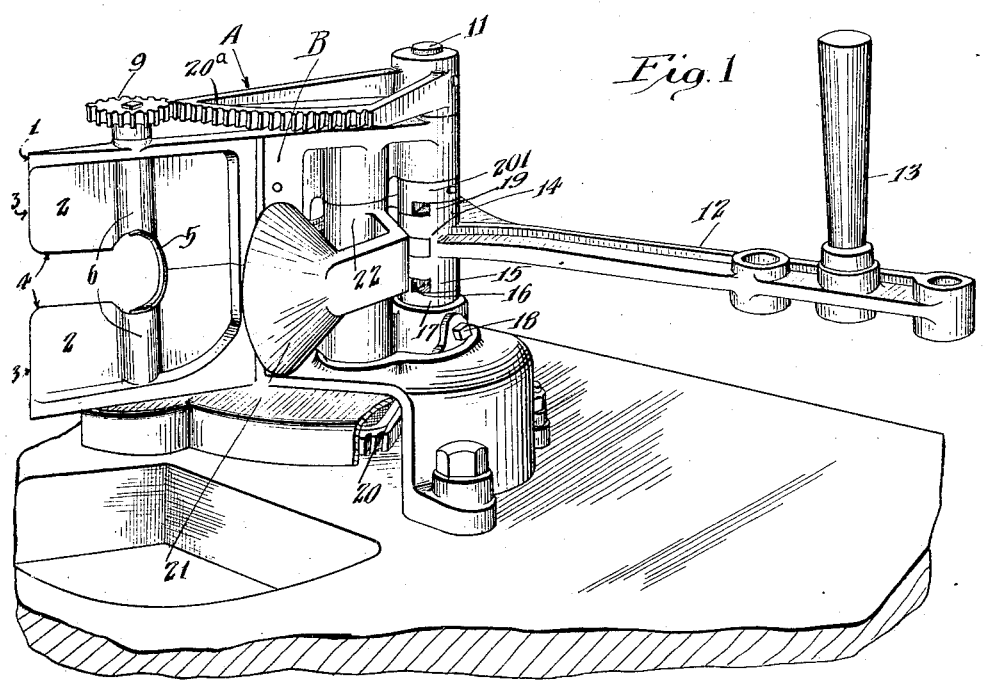
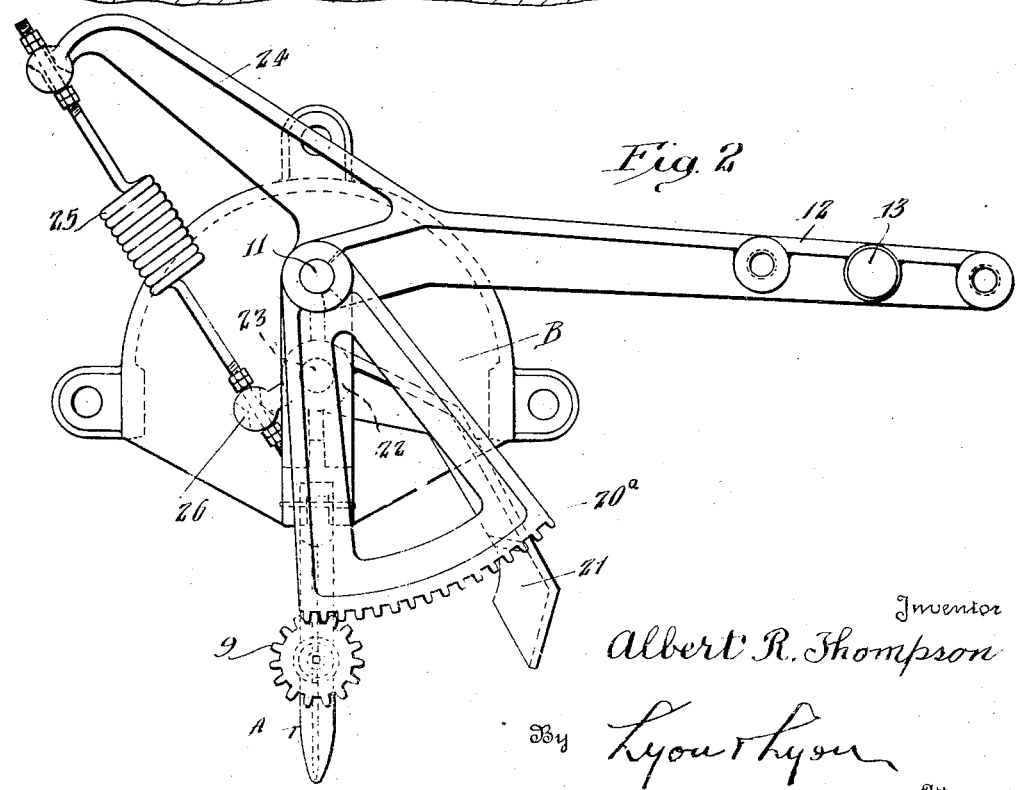

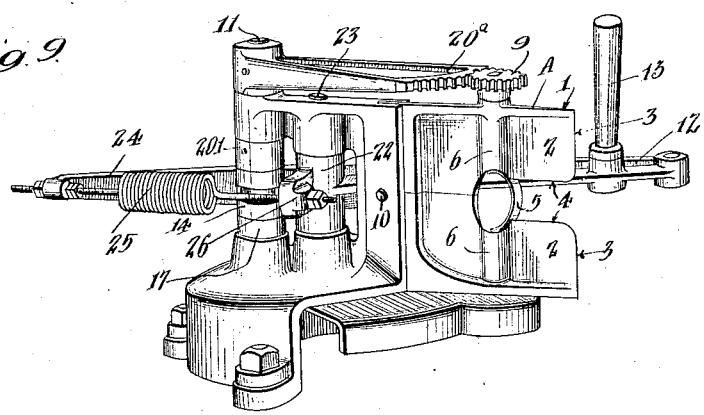
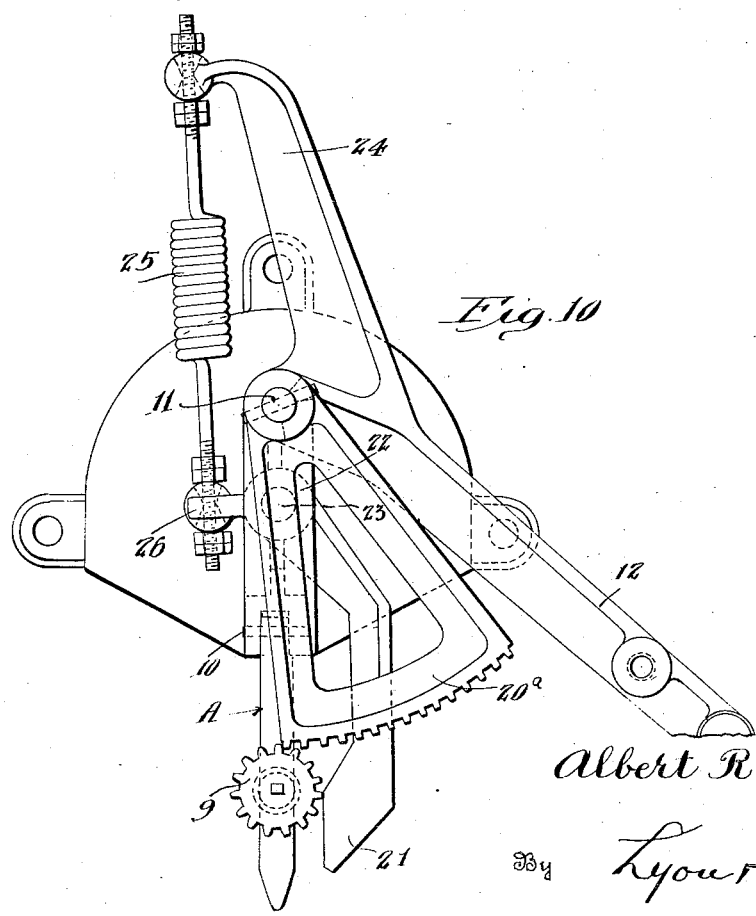

Dec. 16, 1930. A. R. THOMPSON 1,785,016
FRUIT PITTER
Filed Feb. 2, 1926 4 Sheets-Sheet 4
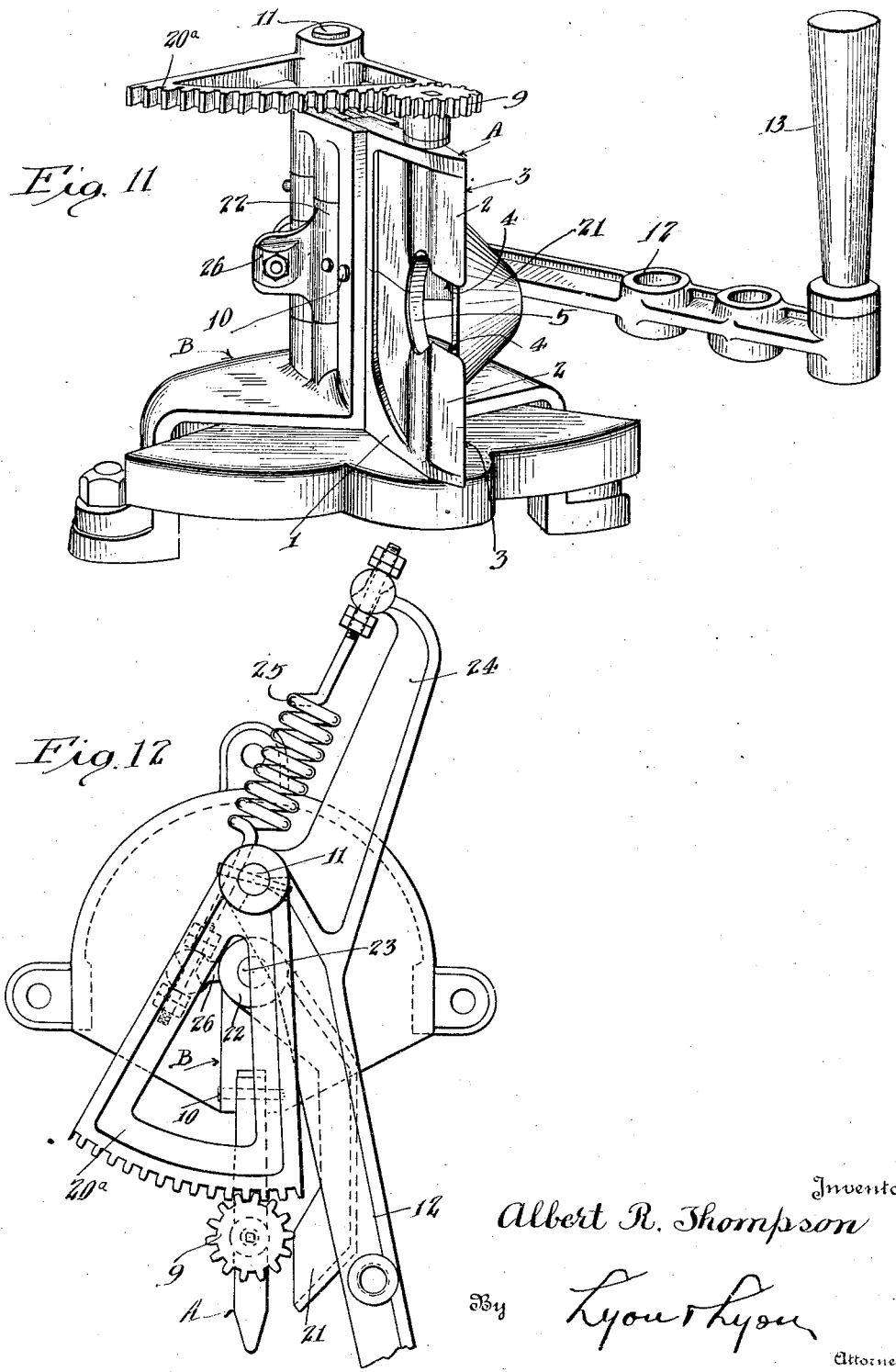
Inventor
Albert R. Thompson
By Lyon & Lyon
Attorneys Patented Dec. 16, 1930

1,785,016

UNITED STATES PATENT OFFICE

ALBERT R. THOMPSON, OF SAN JOSE, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTER

Application filed February 2, 1926. Serial No. 85,513.

The invention relates to a machine for removing pits or stones from fruit and particularly to a machine for pitting clingstone peaches.

In my application Serial No. 62,377, filed October 14, 1925, I have described a unit or device providing a bifurcated or slotted blade upon which fruit may be impaled with the intact pit positioned in the aperture formed in the blade so as to engage a revolvable curved pitting knife mounted in the blade. While my present invention in its various aspects is not necessarily limited to the specific details of the unit or device illustrated in my said earlier application, it provides a type of machine in which such a unit or device may be readily incorporated.

A further object of my invention is to provide an improved method of driving a curved pitting knife. A knife of this type must be relatively thin and narrow to be efficient and lacks the required inherent rigidity to assure the maintenance of its desired form in operation. It has been observed that such a knife tends to flex or deform in operation if driven from one of its ends only as has been the prior practice in this art. I have found that this tendency of the knife to flex or deform to an objectionable extent can be obviated by driving the knife from both of its opposite ends simultaneously and the present invention provides means for accomplishing this purpose.

A further object of this invention is to provide a device in which a single manually operated lever actuates all the necessary moving parts. Since it is desired to employ a holder to engage a portion of the fruit and maintain the same in position on the bifurcated or slotted blade during the pitting operation, it is necessary to provide an arrangement whereby this holder will be operated in proper relation to the pitting knife by the single actuating lever and without damaging the fruit. The present invention provides such an arrangement whereby the first portion of the movement of the single manually operated lever causes the fruit holder to yieldably engage the fruit under tension and avoids building up additional tension on the fruit holder that might damage the fruit during the remaining travel of the operating lever necessary to turn the pitting knife.

An additional object of the invention is to provide a machine which may be readily accommodated to fruit of varying sized pits. It is known that different varieties of such fruit as clingstone peaches have different sized pits. To insure the best results, the bifurcated or slotted blades to be employed with this invention must permit the run of a limited sized pit or the operation will not be properly centered and the pitting irregular. The present invention provides a structure in which the units comprising the impaling blade and pitting knife may be readily interchanged so that the machine may be readily accommodated to the size pit to be run.

Various other advantages and objects of the present invention will be apparent from its employment and will appear from the following description of a preferred illustrative embodiment thereof.

In the accompanying drawings:

Figure 1 is a side elevation of the machine mounted upon a suitable support adapted to receive the halved sections of fruit and the separated pits;

Figure 2 is a top plan view of the machine showing the parts in position prior to the first movement of the operating arm;

Figure 3 is a side elevation of the machine taken at a somewhat different angle from Figure 1 and showing means attached to the impaling blade for removing the tips or sharp projections at the blossom end of the fruit;

Figure 4 is a detail section of the actuating shaft;

Figure 5 is a detail view illustrating the curved pitting knife and driving pinions fixed to the knife at its opposite ends;

Figures 6, 7 and 8 show in detail the adjustable stop, hub of the operating lever, and clutch member, respectively, mounted on the actuating shaft;

Figure 9 is a side elevation of the machine taken from another angle;

Figure 10 is a top plan view of the machine showing the parts in the position assumed upon the completion of the first portion of the movement of the operating lever;

Figure 11 is a front elevation of the machine showing the parts in the position assumed upon completion of the movement of the operating lever, and Figure 12 is a top plan view of the machine illustrating the parts in the position shown in Figure 11.

In the drawings, A indicates an impaling and pitting unit comprising a slotted or bifurcated impaling blade 1 providing bifurcations 2. Each bifurcation 2 is sharpened to provide knife edges 3 and 4. A revoluble pitting knife 5 is mounted at the back of the slot of the impaling blade 1. Opposite ends of the knife 5 are journaled in bearings 6 formed on the bifurcations 2. An expansion of the blade 1 at the back of the slot provides the bearings 6 in which the knife 5 is mounted, and preferably produces a substantially wedge-shaped blade. The impaling blade 1 is preferably formed in two pieces to permit the assembly of the knife 5 and the two pieces of the impaling blade are assembled together with the knife 5 to provide a readily removable or detachable impaling and pitting unit. Such impaling and pitting unit also embodies driving pinions 9 fixed to the knife 5 at its opposite ends.

The impaling and pitting unit A is readily and detachably secured to the main frame B of the machine by means of a suitable tongue and groove connection made at the rear of the impaling and pitting unit and is locked in position by a pin 10 (see Figure 9). This arrangement enables the impaling and pitting unit A to be readily interchanged to provide a unit having the particular dimensions desired to meet the size of the pits of the fruit being run.

The main frame B of the machine carries an actuating shaft 11 mounted preferably substantially in alinement with and in the plane of the impaling and pitting unit. An operating lever 12 having a handle 13 is provided with a hub 14 mounted intermediate the ends of the actuating shaft 11, and preferably provides an operating member movable in a direction substantially at right angles to the plane of the impaling and pitting unit A. The hub 14 of the operating lever 12 is provided at its under side with a shoulder 15 adapted to engage a complementary shoulder 16 formed on the adjustable stop 17 (see Figure 4). The adjustable stop 17 is positioned and secured in the main frame of the machine by means of a set-screw 18 so as to properly center the pitting knife 5. The upper face of the hub 14 is provided with a shoulder 19 adapted to engage a clutch element 20 fixed to the actuating shaft 11.

A pair of segmental gears 20ª are fixed to opposite ends of the actuating shaft 11 and engage in driving relation the pinions 9 formed at the opposite ends of the pitting knife 5 when the impaling and pitting unit A is positioned in the main frame of the machine B. The segmental gears 20ª in conjunction with the pinions 9 provide means for driving the pitting knife 5 from both of its opposite ends simultaneously.

A fruit holder 21 is movably mounted on the main frame of the machine by means of a hub 22 adapted to rock on a shaft 23. The operating arm 12 is provided with an extension 24 projecting on the opposite side of the main actuating shaft 11 from the impaling and pitting unit A. A spring 25 connects the outer end of the extension 24 of the operating lever 12 with a projection 26 formed on the hub 22 of the fruit holder 21. The connection between the fruit holder 21 and operating arm 12 through the extension 24 of the operating arm 12 and the spring 25 is such that upon the initial movement of the operating arm 12, a tension is built up in the spring 25 due to the travel of the outer end of the extension 24, but upon the parts reaching the position illustrated in Figure 10, the outer end of the extension 24 will have substantially reached center relative to the shaft 23 and the continued movement of the operating arm 12 will not build up further tension on the fruit holder 21, as the pitting knife 5 is turned.

In operation, the impaling and pitting unit A is positioned in the main frame of the machine bringing the pinions 9 into engagement with the segmental gears 20. Fruit is impaled upon the blade 1 by forcing the stem end of the fruit against the front knife edges 3 of the bifurcations 2 so that the pit or stone is received in the slot of the blade 1. The fruit is forced upon the blade 1 until the pit or stone contacts with the pitting blade 5 and the fruit is then turned to complete an annular cleft in the flesh of the fruit and to bring the pit into proper alignment with the pitting knife 5. During the impaling of the fruit upon the blade 1, the parts are in the position shown in Figure 2 with the fruit holder 21 out of contact with the fruit and with the operating handle 12 at the extremity of its backward movement. When the fruit has been impaled on the blade 1 in the manner described, the operating arm 12 is brought forwardly manually by the operator to pit the fruit. During the first portion of the forward movement of the operating arm 12, the shoulder 19 is out of engagement with the clutch member 12 and the pitting knife 5 remains stationary, but the outer extremity of the extension 24 of the operating arm 12 exerts a force through the spring 25 to bring the fruit holder 21 in contact with the half of the fruit that is to be last pitted, and upon the fruit holder 21 contacting with the fruit, builds up tension in the spring 25 until the outer extremity of the extension 24 has substantially reached the center of the shaft 23. Further forward movement of the operating arm 12 does not, therefore, substantially increase the tension applied to the fruit holder 21 but brings the shoulder 19 on the hub 14 into contact with the clutch element 12 and rocks the shaft 11. The movement of the shaft 11 actuates the segmental gears 20ª which in turn drive the pinions 9 and turn the knife 5 about the pit of the fruit that has been impaled on the blade 1. Upon the pitting knife 5 cutting the first half of the flesh of the fruit from the pit, that portion of the flesh of the fruit will fall away but the remainder of the fruit and pit will be maintained in position on the blade 1 by the fruit holder 21 until the pitting knife 5 has completed its cutting of the second half of the flesh of the fruit from the pit, whereupon the operator will permit the operating arm 12 to return to the extremity of its rearward position, thus moving the fruit holder 21 away from the fruit and permitting the second halved portion of the flesh of the fruit to fall away.

The invention is not limited to the details of the illustrative machine described in the foregoing specification but is of the full scope of the following claims.

I claim:

1. In a fruit pitter, a curved knife for cutting the flesh of the fruit from the pit and means for rotating the knife from both of its ends simultaneously.

2. In a fruit pitter, a single pieced thin curved knife for cutting the flesh of the fruit from the pit and means for rotating the knife from both of its opposite ends simultaneously.

3. In a fruit pitter, a curved pitting knife formed of a relatively thin piece of metal, a driving pinion fixed to each of the opposite ends of said knife, and means for simultaneously driving said pinions to turn the knife.

4. In a fruit pitter, a relatively thin curved pitting knife, a driving pinion fixed to each of the opposite ends of said knife, segmental gears engaging said pinions and fixed to a single actuating shaft, and an operating member for actuating said shaft to turn said knife.

5. In a fruit pitter, a wedge-shaped bifurcated impaling member, a revolvable pitting knife having its opposite ends mounted on said bifurcations, and means for simultaneously driving the pitting knife from both of its ends.

6. In a fruit pitter, a bifurcated impaling blade, a bearing on each bifurcation, a curved pitting knife having its opposite ends mounted in said bearings, a driving pinion fixed to each of the opposite ends of said knife, an operating lever, and means actuated by said lever for simultaneously driving each of said pinions to turn said knife.

7. In a fruit pitter, an impaling member upon which fruit may be forced to complete an annular cleft in the flesh of the fruit, a curved knife mounted on said impaling member for cutting the flesh of the fruit from the pit, and means for driving the knife from both of its ends simultaneously.

8. In a fruit pitter, an impaling blade, a fruit holder, a curved pitting knife, and a single operating lever inherently yieldably connected with said holder to move the same to engage a portion of fruit to maintain the same in position on the blade and to turn said knife.

9. In a fruit pitter, an impaling blade, a fruit holder, a curved pitting knife, and a single operating lever inherently yieldably connected with said fruit holder and adapted in its travel to first move said holder to engage a portion of fruit to maintain the same in position on the blade and thereafter turn said knife.

10. In a fruit pitter, an impaling member, a fruit holder, a curved pitting knife, and a single operating lever adapted to move said holder into position to resiliently engage a portion of fruit to maintain the same in position on the impaling member and to turn said knife.

11. In a fruit pitter, an impaling member, a yieldably mounted fruit holder, a curved pitting knife, and a single operating lever operatively connected under tension with said holder and adapted in operation to first apply sufficient tension to the holder to cause the same to engage a portion of the fruit to maintain the same in position on the impaling member without damaging the fruit and to then turn the pitting knife without applying further tension to the holder.

12. In a fruit pitter, an impaling member, a fruit holder, a curved pitting knife, an operating lever, means connecting said operating lever and said fruit holder to apply tension to said holder to cause the same to yieldably engage a portion of the fruit to maintain the same in position on said impaling member, and means connecting said operating lever and said pitting knife, said last named means including a clutch adapted upon movement of said operating lever to cause said pitting knife to turn after said holder has engaged the fruit.

13. A fruit pitter comprising a supporting structure, means thereon for turning a pitting knife, said structure being adapted to readily interchangeably receive an impaling and pitting unit, said unit including a curved pitting knife, driving connection between said turning means and said pitting knife being established when said unit is positioned in said structure.

14. A fruit pitter comprising a structure providing means for turning a pitting knife including spaced segmental gears, means for readily and interchangeably securing an impaling and pitting unit to said structure between said segmental gears, the said unit embodying a curved knife having pinions fixed at either end of said knife to engage said segmental gears when the unit is secured to said structure.

15. A fruit pitter comprising a supporting frame structure, a pitting unit consisting of a bifurcated impaling blade and a revolvable pitting knife mounted on said blade, means for removably and interchangeably securing said unit to said supporting frame structure, and operating means for actuating said revolvable pitting knife, rendered operative when said unit is assembled in said supporting frame.

16. In a fruit pitter, an impaling blade, a fruit holder, means for pitting fruit while the same is supported on the impaling member, means for actuating the fruit holder to engage the fruit on its outer periphery while the same is on the impaling member, and means adapted to actuate the pitting means to pit the fruit after the fruit holder has been moved to engage the fruit supported on the impaling member.

17. In a fruit pitter, an impaling member, a fruit holder, pitting means, means for moving the fruit holder in position to engage the fruit on its outer surface while the fruit is impaled on the impaling member, means for actuating the pitting means, and means connecting the means for moving the fruit holder, and means for actuating the pitting means so that the pitting means is actuated only after the fruit holder is moved into position to engage the fruit.

18. In a fruit pitter, an impaling member, a fruit holder, a pitting means, means for actuating the pitting means including a lost motion mechanism, and means connected with the means for actuating the pitting means for moving the fruit holder in position to engage the fruit so that on operation of the means for actuating the pitting means the fruit holder is moved into position to engage the fruit on the impaling blade before the pitting is actuated.

19. A fruit pitter comprising a supporting structure, means thereon for turning a pitting knife, said structure being adapted to removably receive an impaling and pitting unit, said unit including a curved pitting knife, a driving connection between said turning means and said pitting knife being established when said unit is positioned in said structure.

Signed at Washington, D. C., this 2nd day of Feb., 1926.

ALBERT R. THOMPSON.